Figure 1:
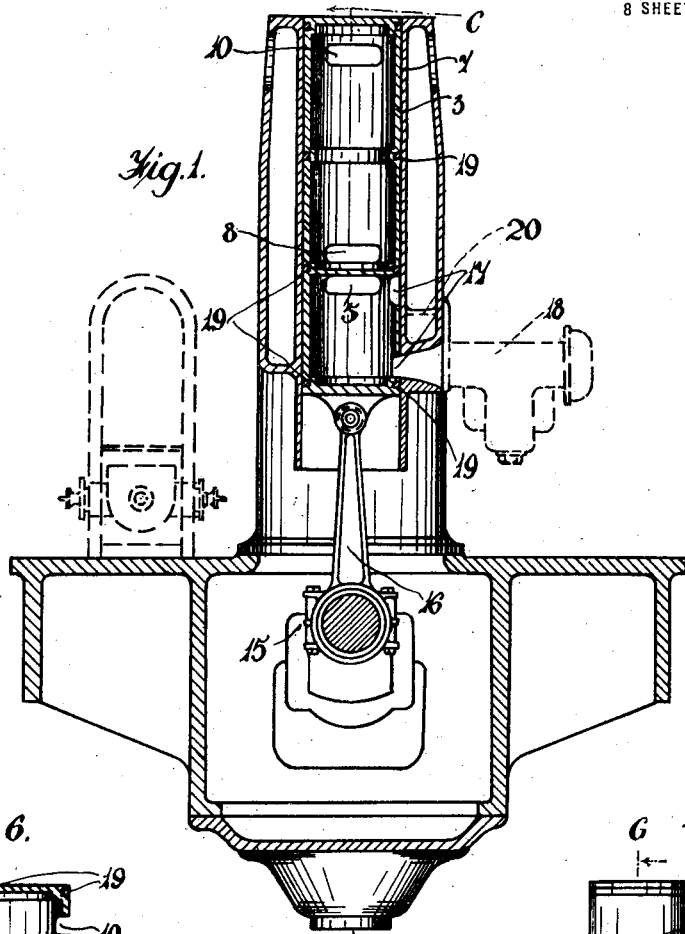

J. T. BOOTH.
INTERNAL COMBUSTION ENGINE.
APPLICATION FILED JULY 23, 1918.

1,405,747.

Patented Feb. 7, 1922.
8 SHEETS—SHEET 1.

Inventor:-
John Thomas Booth,
By:- B. Singer atty.

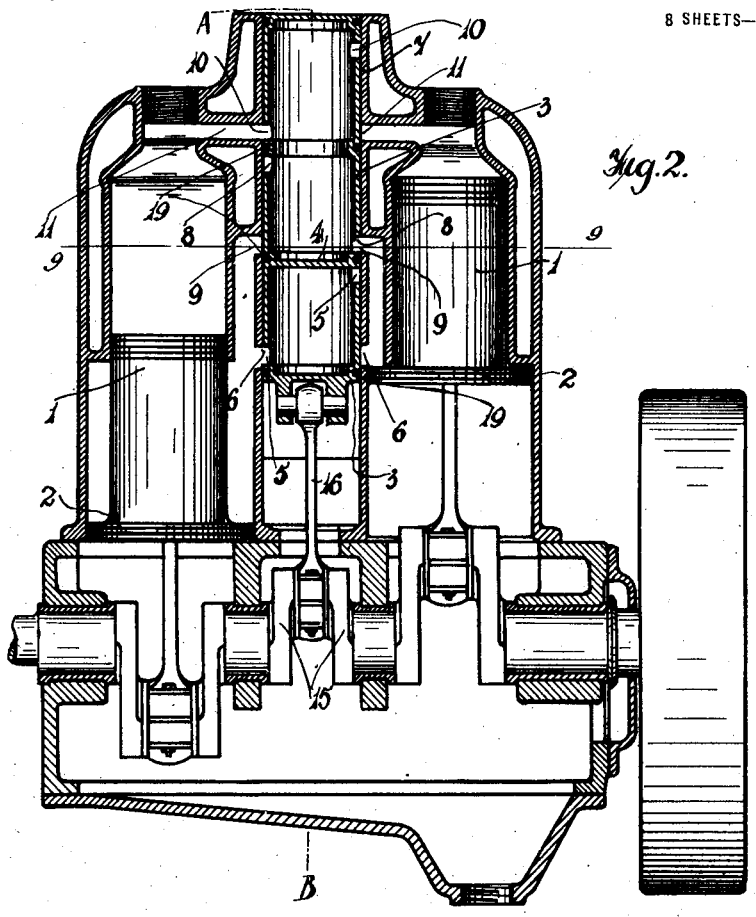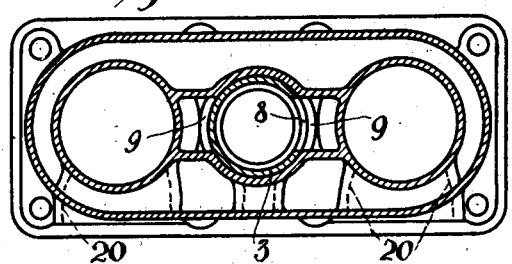

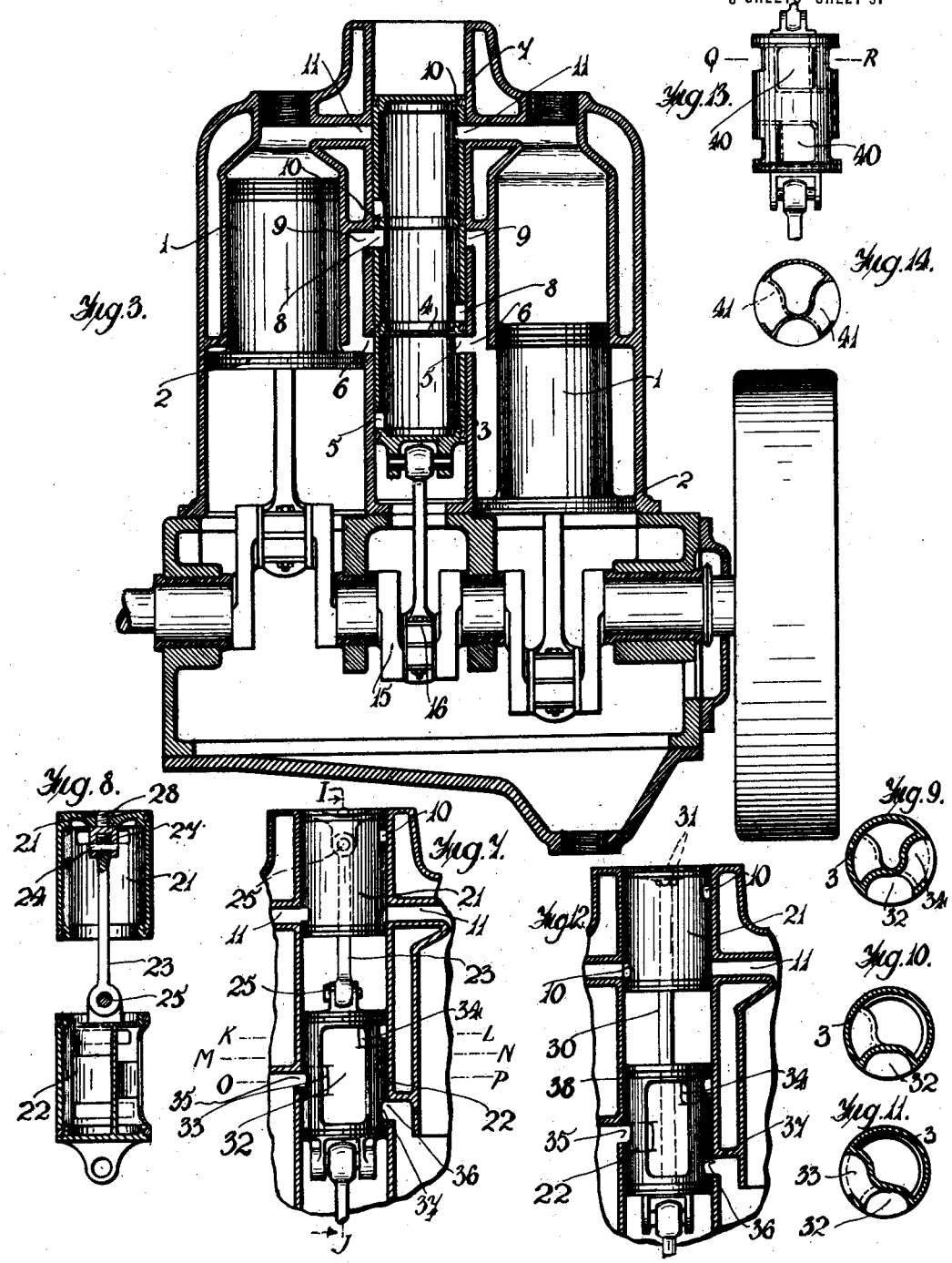

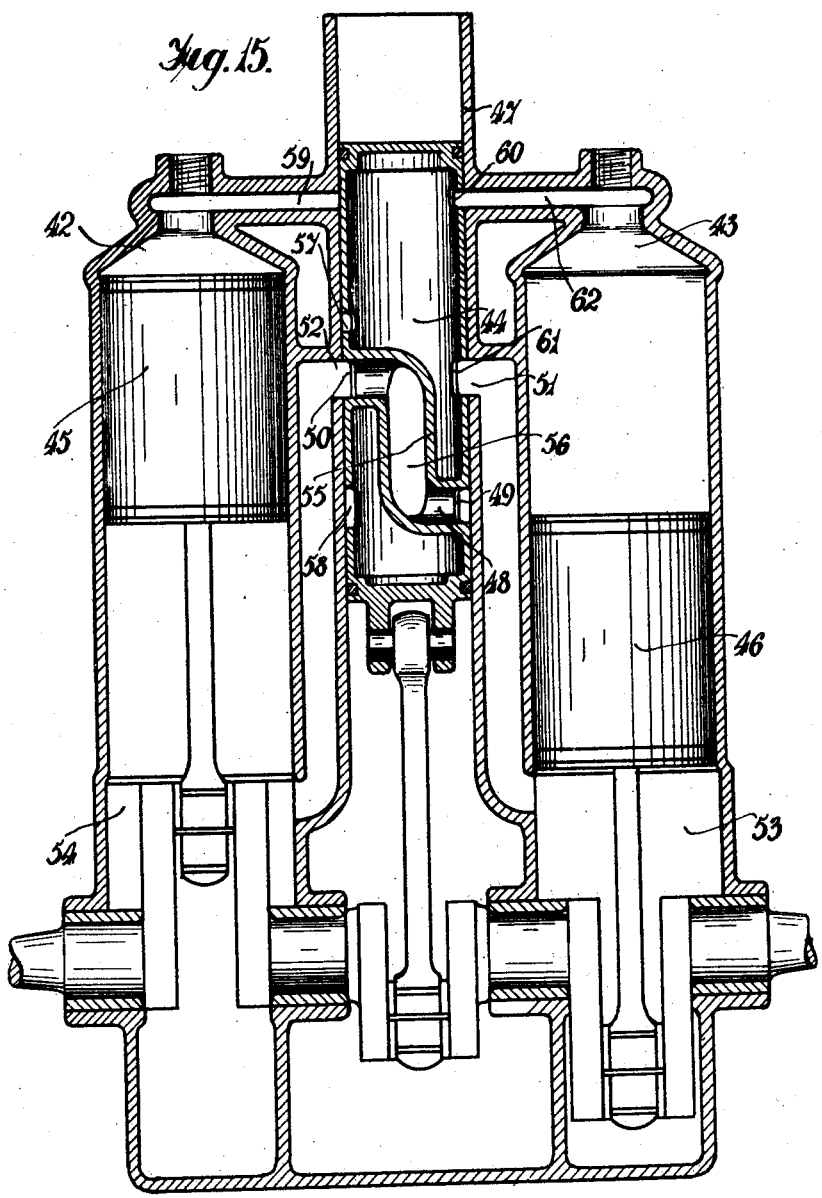

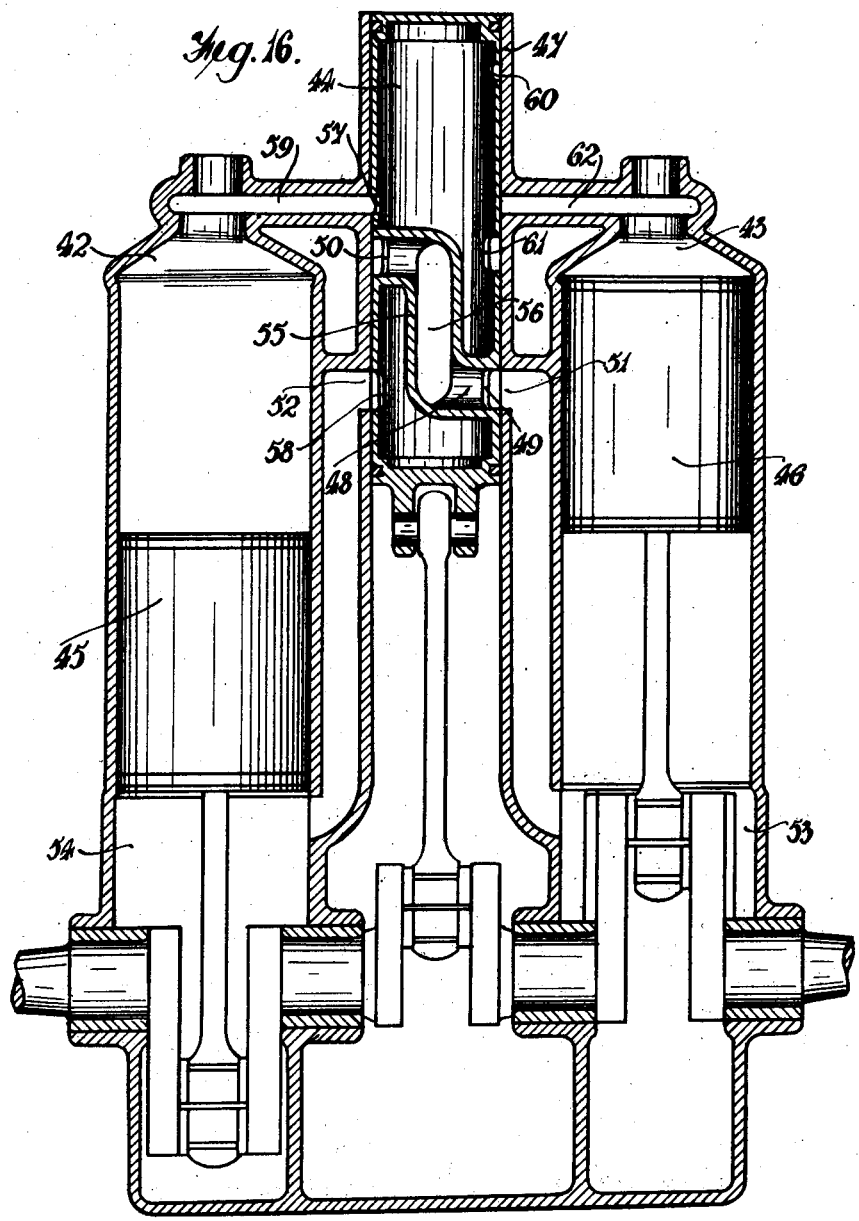

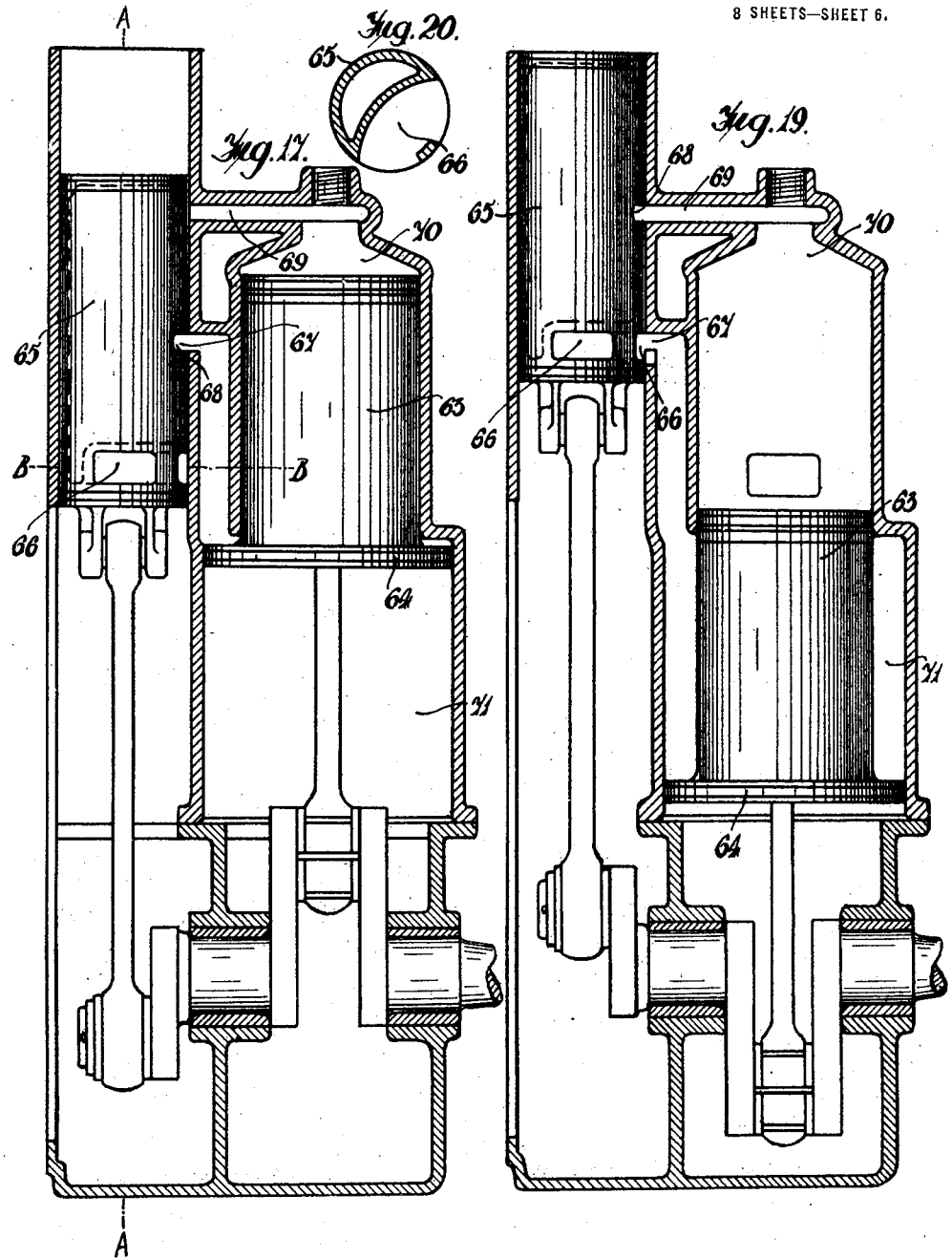

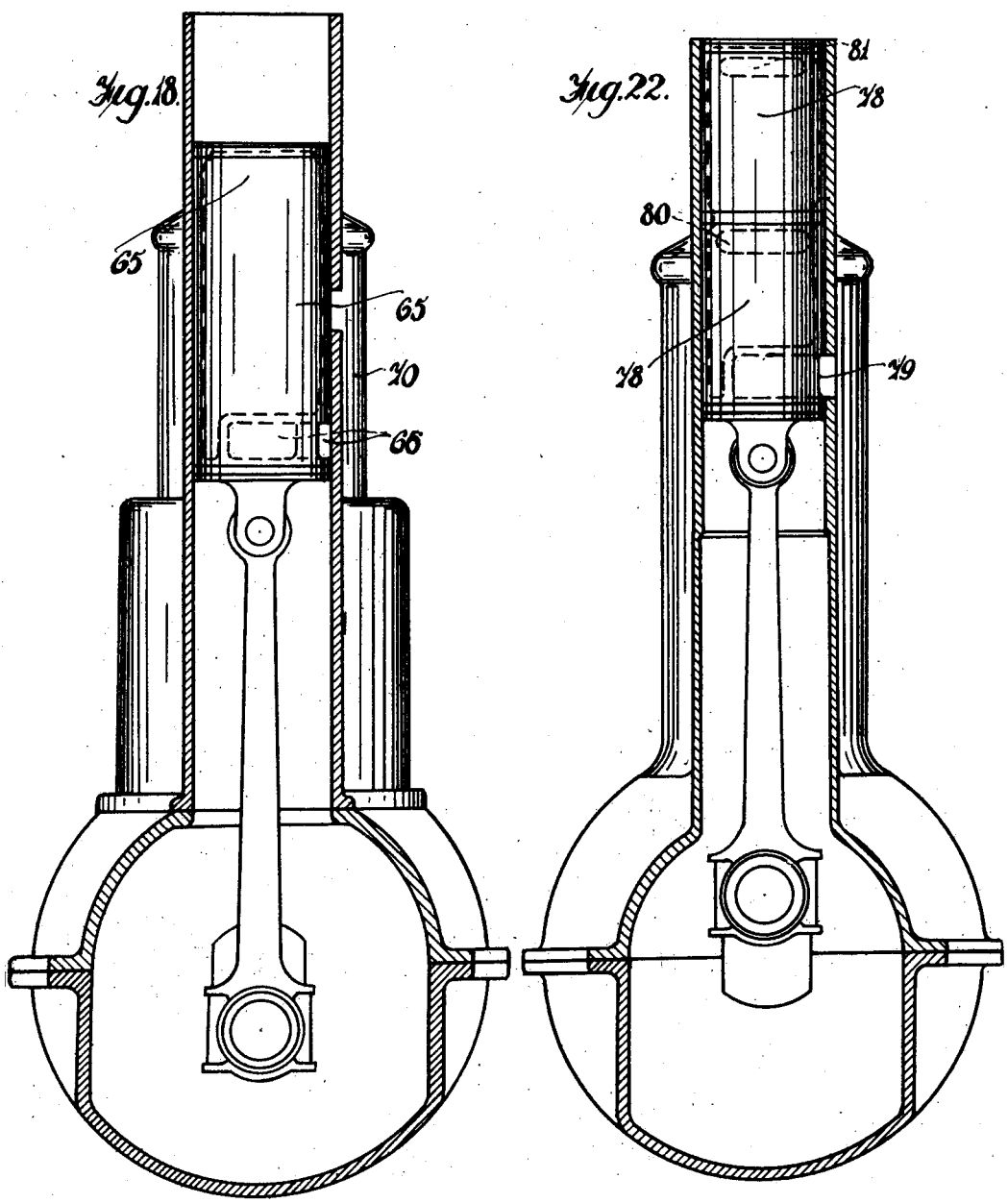

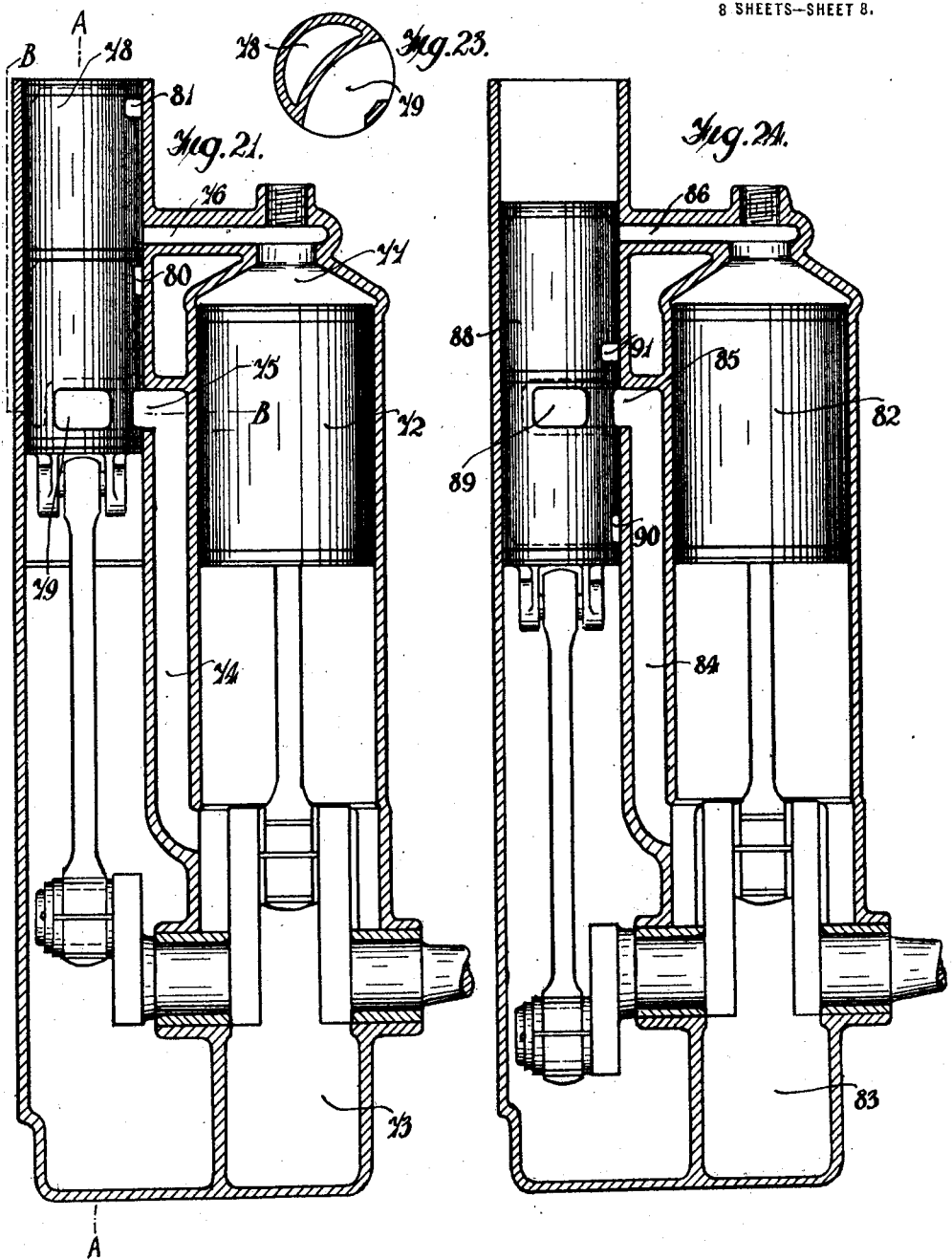

UNITED STATES PATENT OFFICE.

JOHN THOMAS BOOTH, OF BIRMINGHAM, ENGLAND.

INTERNAL-COMBUSTION ENGINE.

1,405,747.  Specification of Letters Patent.  Patented Feb. 7, 1922.

Application filed July 23, 1918. Serial No. 246,403.

*To all whom it may concern:*

Be it known that I, JOHN THOMAS BOOTH, a subject of the King of Great Britain, residing at 69 Stafford Road, Handsworth, Birmingham, in the county of Warwick, England, have invented new and useful Improvements in Internal-Combustion Engines; and I do hereby declare the following to be a full, clear, and exact description of the same.

My invention comprises improvements in internal combustion engines of the kind which employ a reciprocating sleeve valve or a hollow reciprocating valve; the object of the present invention being to provide an improved and more efficient engine or valve control.

In one form of my apparatus, intermediate between two cylinders, or contacting with two cylinders, is a sleeve or hollow reciprocating valve which controls the admission of fuel to both cylinders.

In another form I employ the sleeve or hollow reciprocating valve to control the admission of fuel to a single cylinder engine.

The valve may comprise a single sleeve or it may be in two lengths, preferably of piston-like form, united together by a flexible rod or connection so as to compensate for inaccuracy in boring the valve cylinder and to obviate troubles which might arise owing to warping when a very long valve is employed.

An engine according to this invention broadly comprises a cylinder containing a piston, pumping mechanism, a reciprocating valve disposed parallel to said cylinder, and transverse ports in the periphery and intermediate the ends of said valve first to admit fuel to the interior of the valve, secondly to admit the fuel to the pumping mechanism from the interior of the valve, thirdly to convey the fuel from the pumping mechanism to another part of the valve interior and fourthly to convey the fuel from said last interior valve part to the cylinder.

Instead of employing separate piston pumping mechanism I may make use of the crank case as a pumping chamber and in this form of the invention I employ a reciprocating piston valve having a passage leading through the valve and closed to the interior of the valve for the admission of the fuel to the pumping chamber.

Referring to the drawings:—

Figure 1. is a vertical section through an engine according to one form of this invention at A—B in Figure 2.

Figures 2 and 3. are sections at C—D in Figure 1 shewing the valve and pistons in different positions.

Figure 4. is a horizontal section at E—F in Figure 2 with the pistons removed.

Figure 5:
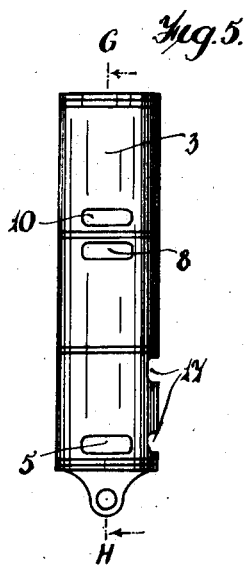

Figure 5. is an elevation of the valve removed.

Figure 6:
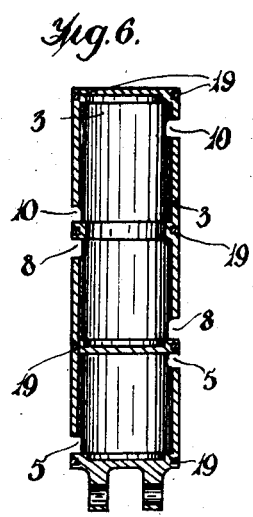

Figure 6. is a section at G—H in Figure 5.

Figure 7. is a sectional view of a valve chamber and shewing a modified form of valve in position.

Figure 8. is a section through the valve at I—J in Figure 7.

Figures 9, 10 and 11. are sections through the valve at K—L, M—N, and O—P in Figure 7.

Figure 12. is a similar view to Figure 7 shewing a modified form of valve.

Figure 13. is an elevation of a modified form of lower valve member.

Figure 14. is a section at Q—R in Figure 13.

Figure 15. is a sectional side elevation shewing another form of the invention with the valve in its lowest position.

Figure 16. is a similar view to Figure 15 shewing the valve in its highest position.

Figure 17. is a sectional side elevation shewing a third form of engine according to this invention.

Figure 18. is a section on line A—A of Figure 17.

Figure 19, is a similar view to Figure 17 shewing the valve in its highest position.

Figure 20. is a section on line B—B of Figure 17.

Figure 21. is a sectional side elevation shewing a fourth form of engine according to this invention.

Figure 22. is a section on line A—A of Figure 21.

Figure 23. is a section on line B—B of Figure 21.

Figure 24. is a sectional side elevation of a fifth form of the invention.

In the construction of an engine according to one form of the invention as shewn upon the accompanying drawings at Figures 1-6, the pistons 1 are each provided with an annular extension or additional piston portion 2 the upper surface of which acts as a pump. The valve 3 is ported and divided into two parts or lengths by means of a diaphragm 4, the lower portion having ports 5 co-acting with ports 6 in the cylinder 7 and controlling the admission of the fuel to the annular pumps, whilst the upper portion is provided with two sets of ports, one set 8, 8 of which controls the discharge of the fuel from the annular pump by way of cylinder ports 9, 9 to the interior of the upper portion of the valve, whilst the other set of ports 10, 10 controls the passage of the gas from the interior of the valve to the cylinders by cylinder ports 11, 11. Each pump serves to supply gas to the combustion space of the opposite cylinder.

The engine cranks 14 are preferably set at 180° to each other as is usual in two cylinder engines, so that when the one piston is at the top of its stroke the other piston is at the bottom as seen in Figures 2 and 3. The valve 3, which is in the form of a hollow cylinder, is divided by a diaphragm into two lengths, the lower portion being half the depth of the upper portion, and this valve is preferably driven from the engine shaft by crank 15 and connecting rod 16, the engine being of the two stroke cycle type.

The corresponding ports in each of the two pump chambers and cylinders are preferably at the same height and the valve is then provided with two sets of ports on diametrically opposite sides of the valve, one set being for each piston with its corresponding pump. Or the ports in the cylinders may be at different heights and the piston ports correspondingly arranged so that they are open when the valve is at the extremities of its travel.

The valve crank may be conveniently set at the same angle, or approximately at the same angle, as the one piston crank, in which case the one port in the lower chamber of the valve would be near to the lower end of the valve so that it registers with the port in the cylinder having its crank at 180° to the valve when this annular pump and its piston are at the lower end of its travel, whilst the sleeve is at its upper end as seen in Figure 2. The second port in the lower portion of the valve is then set a distance above the first port equal to the throw of the valve crank, so that this port will open when the valve is at the lower extremity of its travel as seen in Figure 3.

Each annular pump chamber has two ports 6, 9 one of which registers with the aforementioned port 5 in the lower portion of the valve when the annular pump is at the bottom of its travel, whilst the other pump port 9 is in the upper portion of the pump chamber or a passage leading out of it and registers with a port 8 in the upper portion of the valve when the pump is at the top of its stroke.

As previously stated, the sleeve is divided into two lengths by a diaphragm, the lower portion being one third of the total length and is provided with a pair of ports for controlling the admission to the pump chamber, whilst the lower part of the upper portion is provided with a pair of ports for controlling the discharge from the pumps to the interior of the valve, whilst the upper portion is provided with ports for controlling the passage of the gas from the interior of the valve to the cylinders. The corresponding ports in the upper portion of the sleeve are at a distance from each other equal to the travel of the valve, being so arranged that when the valve is at its upper extremity there are three ports open, namely, the ports 5, 6 admitting gas from the valve to the one pump and ports 10, 11 admitting gas from the upper part of the valve to the combustion space of the same cylinder. The third open ports, viz. 8, 9 are in the second cylinder and serve to control the passage of gas from the second pump to the interior of the upper part of the valve, this second pump serving to force the gas through the aforementioned open port into the first cylinder. When the valve is at the lower extremity of its travel the position would be reversed, there being two ports open in connection with the second cylinder and one (i. e., the middle one) in connection with the first cylinder.

The lower portion of the valve is also provided with a transverse port or ports 17 in the periphery and intermediate the ends of the valve for admitting gas to the interior thereof from the carburetor 18, one of these ports being arranged to be open at the same time as the ports communicating with the pumps so that the downward movement of the pumps will serve to suck the gas into and through the valve. The exhaust ports are indicated by the dotted lines at 20.

The upper end of the valve may be closed as shewn, or open and the cylinder end closed as desired and when the valve is provided with ports as hereinbefore described the engine may be a simple two cylinder one, or may be built in multiples of two. It may be either air cooled or water cooled as desired and is particularly adapted for use with aircraft. The valve is preferably provided with "piston rings" as 19 at its extremities and between the different sets of ports.

In the form of the invention shewn by Figures 7-11, the valve is in two parts 21, 22 each of which may be conveniently of piston-like form with the head or closed end at the top of the upper member 21 and at the bottom of the lower member 22. These members may be conveniently approximately equal to a little more than one third of the total length of the valve and are connected together by means of a flexible rod 23. The extremities of this rod may be pivotally connected to each of the piston members as at 24, 25 with the pivot axes at right angles to each other so as to provide practically a universal connection and to compensate for warping of the valve or valve casing in any direction. The extremities of the connecting rod may be disposed between a pair of lugs 27 secured to the piston members, such lugs being conveniently provided with a screwed shank portion 28 which is secured to the piston member by a nut.

Or in a modified construction as seen in Figure 12 a simple central rod 30 may be employed passing through the extremities of the piston members and being secured by nuts 31, the flexibility of the rod being sufficient to provide the necessary compensation. This form of the invention has the advantage that the distance between the two valve parts, or between the crank and the valve parts, may be altered at will to adjust the valve openings as desired.

In the construction first described the valve was divided by a diaphragm into two lengths, the lower portion of which controlled the passage of the gas from the carburetor to the annular pistons, whilst the upper portion controlled the transfer of the gas from the annular pistons to the combustion space. In the construction shewn by Figures 7–12 there is no dividing diaphragm, but there is a large transverse recess or port 32 in the lower valve member and intermediate ends of the valve communicating with the carburettor and having two closed passages 33, 34 extending across the valve at different heights, one 33 adapted to register with one annular piston port 35 when the valve is at the top of its stroke and the other 34 adapted to register with the other annular piston port 36 when the valve is at the bottom of its stroke. The annular piston ports may be conveniently at different heights and the lower valve member is provided with a port 37 which registers with the lower annular piston port 36 when the valve is at the top of its stroke as seen in Figures 7 and 12, this valve port opening to the interior of the valve as distinguished from the closed passage and is so arranged that when it is in register a port 10, 11 in the upper valve member is open to the combustion space of the opposite cylinder. A second port may be provided in the lower valve member adapted to open when the valve is at the bottom of its stroke, but I preferably arrange that the valve is of such a depth that it uncovers the second and higher annular piston port when it reaches the bottom of its travel.

As in the construction first described, when the valve is at either extremity of its stroke one annular piston is sucking in gas from the carburetor and the corresponding power piston is receiving gas through the valve and from the second annular piston which is also rising and compressing the gas. When the valve is at the other extremity of its travel the same action is taking place, but in respect of the opposite cylinder.

The valve members would be provided with spring piston rings 38 disposed one at the top and one at the bottom of each valve member.

In Figures 13 and 14 I have shewn a form of valve similar to the part 22 shewn in Figures 7–12 but in this case two short transverse ports 40 intermediate the ends of the valve are employed instead of the one long port 32, each port 40 communicating with a closed passage 41 similar to the passages 33, 34.

Referring to Figures 15 and 16, the working cylinders 42 and 43 are arranged on each side of the reciprocating piston valve 44.

The cylinder 42 is fitted with a working piston 45 and the cylinder 43 is fitted with a working piston 46. The pistons 45 and 46 and the valve 44 are provided with connecting rods connecting them to cranks upon the main engine shaft.

The valve 44 is closed at both ends and is arranged to reciprocate in the valve casing 47. The valve 44 is provided with a transverse passage 48 which is closed to the interior of the valve. This passage 48 is open at both ends and these open ends 49 and 50 alternately register with ports 51 and 52 in the valve casing, which are open respectively to compartments of the crank case, one 53 under the piston 46, and the other 54 under the piston 45. The passage 48 has a vertical portion 55 at about the centre of its length and from this portion 55 there is a transverse passage 56 which may be elongated as shown leading to the exterior of the valve 44 and arranged to be constantly in communication with the carburettor.

The valve 44 is also provided with a pair of ports 57 and 58 in its side opposite to the cylinder 42 and the cylinder 42 is provided with a port 59 near its upper end leading through the valve casing 47. Similar ports 60 and 61 are provided in the other side of the valve 44 and the cylinder 43 is provided with a port 62 similar to the port 59. As will be seen from the drawing the ports 57 and 58 are spaced apart by a distance equal to the spacing of the ports 52 and 59 and the ports 60 and 61 are spaced apart by a distance equal to the spacing of the ports 51 and 62.

Referring particularly to Figure 15, the piston 45 has just reached the top of its stroke with the result that a partial vacuum has been created in the compartment 54. The ports 50 and 52 however have just come into register thus making communication between the carburettor and compartment 54 with the result that the chamber 54 is immediately filled with gas. When the piston 45 descends (see Figure 16) the valve 44 ascends. As the piston 45 begins to move downwardly communication between the ports 50 and 52 is first cut off so that 54 becomes a closed chamber. Further movement of the piston 45 results in the gas in compartment 54 being compressed. This compression proceeds until port 58 registers with port 50 and port 57 with port 59 when the compressed gas from the chamber 54 will pass through the interior of the valve 44 into the combustion chamber of the cylinder 42.

An exactly similar cycle of operations takes place in connection with cylinder 43.

Referring to Figures 17 to 20 which illustrate a single cylinder engine employing a working piston 63 and a pump piston 64 arranged in tandem, the reciprocating piston valve 65 is closed at both ends and is provided with a transverse intake port 66 which is adapted to open communication between a port 67 in the valve casing and the carburettor. The valve 65 is provided with a second port 68 in its side which is open to the main interior of the valve. A port 69 leads from the valve casing to the combustion space of the working cylinder 70.

Referring to Figure 19, where the pump piston 64 is shown in its lowest position; during its downward stroke the piston 64 will have created a partial vacuum in the pump cylinder 71, but when the position shown in Figure 19 is reached the valve port 66 will register with the port 67 so that the pump cylinder will immediately receive a charge from the carburettor. The working piston 63 and pump piston 64 will now commence to move upwardly and the valve 65 to move downwardly. As piston 64 moves up communication between ports 66 and 67 will be cut off owing to the movement of the valve, and the gas above piston 64 will be compressed in the pump chamber. This process will go on until the position shown in Figure 17 is reached when the valve port 68 registers with the port 67 allowing the compressed charge to pass into the interior of valve 65. The pistons 63 and 64 now commence to descend and the valve to move upwardly until valve port 68 registers with port 69 allowing the charge to pass from the interior of the valve 65 to the combustion space of the working cylinder 70.

Referring to Figures 21, 22, and 23, beneath the working piston 72 is a closed chamber 73 in the crank case, and leading from the chamber 73 is a passage 74 terminating in a port 75 through the valve casing. Port 76 is provided leading from the valve casing to the combustion space of the working cylinder 77.

In this construction the valve 78 is closed at both ends and at its lower end is provided with a transverse port 79 closed to the interior of the valve but adapted to allow communication between the port 75 and the carburettor. Above the port 79 and spaced therefrom by a distance equal to the travel of the valve is a port 80 adapted to allow communication between port 75 and the interior of the valve. Near the top of the valve is another port 81 in the side of the valve adapted to allow communication between port 76 and the interior of the valve when the valve is in its lowest position.

In this arrangement when piston 72 is at the bottom of its stroke and commences to move upwards a partial vacuum is created in chamber 73 and passage 74. Upon reaching the position shown in Figure 21 ports 79 and 75 register and gas passes through passage 74 to chamber 73. Piston 72 now commences to move down again and the charge in chamber 73 and passage 74 is compressed. When piston 72 reaches the bottom of its stroke ports 80 and 75 register and ports 81 and 76 register allowing the compressed charge to pass from chamber 73 through passage 74 and the interior of the valve 78 to the combustion space 77 of the working cylinder.

Referring to Figure 24, the working piston 82 has a closed chamber 83 immediately beneath it in the engine crank case. A passage 84, port 85 and port 86 are provided exactly similar to the passage 74 and ports 75 and 76 as described with reference to Figures 21 to 23. The construction of the valve 88 in this case is similar to the construction of the valve 78 described with reference to Figures 21 to 23 only the inlet port 89 and the ports 90 and 91 are differently spaced as in this case the valve crank is set in opposition to the working piston crank instead of coincident with it.

In this construction as the working piston 82 ascends it creates a partial vacuum in chamber 83 and passage 84, and when the piston 82 reaches the top of its stroke the valve port 89 registers with port 85 allowing gas to flow into chamber 83 through the passage 84. When descending the piston 82 compresses this gas until port 90 registers with port 85 and port 91 registers with port 86. When this occurs the gas passes through the interior of valve 88 to the combustion space 87 of the working cylinder.

It will be obvious that in all the constructions herein described the gas is transferred direct to the working cylinders from a portion of the interior of the valve, which is equal in diameter to the full diameter of the valve, and has sufficient volume to form a satisfactory reservoir for gas so that the necessity for an intermediate reservoir or chamber is obviated.

What I claim then is:—

1. In an internal combustion engine of the two stroke cycle type, the combination of a cylinder containing a working piston with which is associated pumping means, a reciprocating hollow cylindrical valve disposed parallel to said cylinder having closed ends and forming two compartments, transverse ports in the periphery and intermediate the ends of said valve, and in the cylinder to control the admission of gas to the interior of the first compartment of the valve, the passage of the gas from the said first compartment of the valve to the pumping means; the passage of the gas from the said pumping means to the second compartment of the valve and the passage of the gas from the said second compartment of the valve direct to the cylinder containing the working piston.

2. In an internal combustion engine of the two stroke cycle type, in combination, a pair of cylinders containing working pistons with which are associated pumping means; a valve of hollow sleeve-like form disposed parallel to and between said cylinders; means for reciprocating said valve; a transverse port in the periphery and intermediate the ends of said valve to admit gas to a portion of the interior of the valve; two other ports in said portion of the valve to allow the gas to pass from said portion to the pumping means; said portion of the valve being divided from the remainder of the interior of the valve by a partition; further ports in other parts of the valve and in the cylinders to control the passage of the gas from the pumping means to another part of the valve interior; and the passage of the gas from said part of valve interior direct to the cylinders containing the working pistons.

3. In an internal combustion engine of the two stroke cycle type, in combination, a pair of cylinders containing working pistons with which are associated pumping means; a reciprocating valve of hollow sleeve-like form disposed between said cylinders; said valve consisting of two lengths connected together; by an independent member means for reciprocating said valve; transverse ports in the periphery and intermediate the ends of the valve and in the cylinders to control the admission of gas to the interior of one length of the valve; the passage of the gas from the interior of the valve to the pumping means; the passage of the gas from said pumping means to another part of the valve the interior of the second length of the valve; and the passage of the gas from the said second length of the valve interior direct to the cylinders containing the working pistons.

4. In an internal combustion engine of the two stroke cycle type, in combination, a pair of cylinders containing working pistons with which are associated pumping means; a valve of hollow sleeve-like form disposed between said cylinders; said valve consisting of two lengths connected together by an independent member means for reciprocating said valve; at least one transverse port in the periphery and intermediate the ends of said valve to admit gas to a portion of the interior of the valve; two other ports in said portion of the valve to allow the gas to pass from said portion to the pumping means; said portion of the valve being divided from the remainder of the interior of the valve by a partition; further ports in other parts of the valve and in the cylinders to control the passage of the gas from the pumping means to another part of the valve interior; and the passage of the gas from said part of valve interior direct to the cylinders containing the working pistons.

5. In an internal combustion engine of the two stroke cycle type, in combination, a pair of cylinders containing working pistons with which are associated pump pistons; a valve of hollow sleeve-like form disposed between said cylinders; said valve consisting of two lengths connected together by a connecting rod pivoted to each part; means for reciprocating said valve; transverse ports in the periphery and intermediate the ends of the valve and ports in the cylinders to control the admission of gas to the interior of the valve; the passage of the gas from the interior of the valve to the cylinders containing the pump pistons; the passage of the gas from said cylinders to another part of the valve interior; and the passage of the gas from said part of valve interior direct to the cylinders containing the working pistons.

6. In an internal combustion engine of the two stroke cycle type, in combination, a pair of cylinders containing working pistons with which are associated pump pistons; a valve of hollow sleeve-like form disposed between said cylinders; said valve consisting of two lengths connected together by a connecting rod pivoted to each part; means for reciprocating said valve; at least one transverse port in the periphery and intermediate the ends of said valve to admit gas to a portion of the interior of the valve;

two other ports in said portion of the valve to allow the gas to pass from said portion to the cylinders containing the pump pistons; said portion of the valve being divided from the remainder of the interior of the valve by a partition; further ports in other parts of the valve and in the cylinders to control the passage of the gas from the cylinders containing the pump pistons to another part of the valve interior; and the passage of the gas from said part of valve interior direct to the cylinders containing the working pistons.

7. In an internal combustion engine of the two stroke cycle type, in combination, a pair of cylinders containing working pistons with which are associated pump pistons; a valve of hollow sleeve-like form disposed between said cylinders; said valve consisting of two lengths connected together by a connecting rod pivoted to each part, said pivots being at right angles to each other; means for reciprocating said valve; transverse ports in the periphery and intermediate the ends of the valve and ports in the cylinders to control the admission of gas to the interior of the valve; the passage of the gas from the interior of the valve to the cylinders containing the pump pistons; the passage of the gas from said cylinders to another part of the valve interior; and the passage of the gas from said part of valve interior direct to the cylinders containing the working pistons.

8. In an internal combustion engine of the two stroke cycle type, in combination, a pair of cylinders containing working pistons with which are associated pump pistons; a valve of hollow sleeve-like form disposed between said cylinders; said valve consisting of two lengths connected together by a connecting rod pivoted to each part, said pivots being at right angles to each other; means for reciprocating said valve; at least one transverse port in the periphery and intermediate the ends of said valve to admit gas to a portion of the interior of the valve; two other ports in said portion of the valve to allow the gas to pass from said portion to the cylinders containing the pump pistons; said portion of the valve being divided from the remainder of the interior of the valve by a partition; further ports in other parts of the valve and in the cylinders to control the passage of the gas from the cylinders containing the pump pistons to another part of the valve interior; and the passage of the gas from said part of valve interior direct to the cylinders containing the working pistons.

9. In an internal combustion engine of the two stroke cycle type, in combination, a pair of cylinders containing working pistons with which are associated pump pistons; a valve of hollow sleeve-like form disposed between said cylinders; means for reciprocating said valve consisting of a connecting rod attached to the valve and to a crank upon the main crank shaft of the engine; transverse ports in the periphery and intermediate the end of the valve and ports in the cylinders to control the admission of gas to the interior of the valve; the passage of the gas from the interior of the valve to the cylinders containing the pump pistons; the passage of the gas from said cylinders to another part of the valve interior; and the passage of the gas from said part of valve interior direct to the cylinders containing the working pistons.

10. In an internal combustion engine of the two stroke cycle type, in combination, a pair of cylinders containing working pistons with which are associated pump pistons; a valve of hollow sleeve-like form disposed between said cylinders; means for reciprocating said valve consisting of a connecting rod attached to the valve and to a crank upon the main crank shaft of the engine; at least one transverse port in the periphery and intermediate the ends of said valve to admit gas to a portion of the interior of the valve; two other ports in said portion of the valve to allow the gas to pass from said portion to the cylinders containing the pump pistons; said portion of the valve being divided from the remainder of the interior of the valve by a partition; further ports in other parts of the valve and in the cylinders to control the passage of the gas from the cylinders containing the pump pistons to another part of the valve interior; and the passage of the gas from said part of valve interior direct to the cylinders containing the working pistons.

In testimony whereof I affix my signature.

JOHN THOMAS BOOTH.